Oct. 17, 1967

O. M. MEHUS 3,348,043

FLUORESCENT DISPLAY SIGN COMPOSED
OF ROTATABLE TRIANGULAR PRISMS

Filed Sept. 23, 1964

INVENTOR.
Orion M. Mehus
BY John A. Hamilton
Attorney.

Oct. 17, 1967　　　　O. M. MEHUS　　　3,348,043
FLUORESCENT DISPLAY SIGN COMPOSED
OF ROTATABLE TRIANGULAR PRISMS

Filed Sept. 23, 1964　　　　　　　　　　　　　3 Sheets-Sheet 2

INVENTOR.
Orion M. Mehus
BY John A. Hamilton
Attorney.

Oct. 17, 1967     O. M. MEHUS     3,348,043
FLUORESCENT DISPLAY SIGN COMPOSED
OF ROTATABLE TRIANGULAR PRISMS

Filed Sept. 23, 1964     3 Sheets-Sheet 3

INVENTOR.
*Orion M. Mehus*
BY *John A. Hamilton*
Attorney.

United States Patent Office

3,348,043
Patented Oct. 17, 1967

3,348,043
FLUORESCENT DISPLAY SIGN COMPOSED OF ROTATABLE TRIANGULAR PRISMS
Orion M. Mehus, 3517 Main St., Kansas City, Mo. 64111
Filed Sept. 23, 1964, Ser. No. 398,728
14 Claims. (Cl. 250—77)

ABSTRACT OF THE DISCLOSURE

This application discloses a display sign comprising one or more triangular prisms rotatable about an axis parallel to the geometrical axes of said prisms, each prism having a pair of indicia panels mounted against and facing inwardly respectively against two faces thereof, said panels being viewed through the third face of the prism, which is unobstructed. As the prism rotates, a viewer at first can see only the first of said panels, but as the rotation continues, the prism reaches a position at which, so far as is apparent to the viewer, the first panel disappears and the second panel appears, with a "fade" or "wipe" action having a novel, intriguing effect.

---

This invention relates to new and useful improvements in display signs, and has as its principal object the provision of a display sign consisting of two sign panels viewed through a moving prism and so arranged that at first only one panel is visible, this panel then disappearing and the second panel coming into view in a simultaneous "fade-out, fade-in" effect. The change from one image to the other is rather "ghostly" in appearance, being without apparent mechanical cause, and is quite novel, attractive and interesting. Its applications are too numerous to enumerate fully, particularly in the advertising field. For example, in a travel service display, the first image may be the name of a particular country or region, and the second image may be the name or picture of a well known tourist attraction of that country or region. In advertising movies, the first image may be the title of the movie, and the second image may consist of the names or pictures, or both, of stars of the movie. In advertising products, the first image may be the name of the company or product, and the second may consist of a picture of the product and its use or application.

Another object is the provision of a display sign of the character described above including a series of the two-panel displays described above, and including a single motion-producing device whereby the displays are exposed to the viewer in a continuously repetitive sequence.

Other objects are simplicity and economy of construction, efficiency and dependability of operation, a novel construction permitting easy and convenient accessibility of the sign panels for changing said panels without disturbing the prisms, and adaptability for use in a wide variety of applications.

Figure 1:
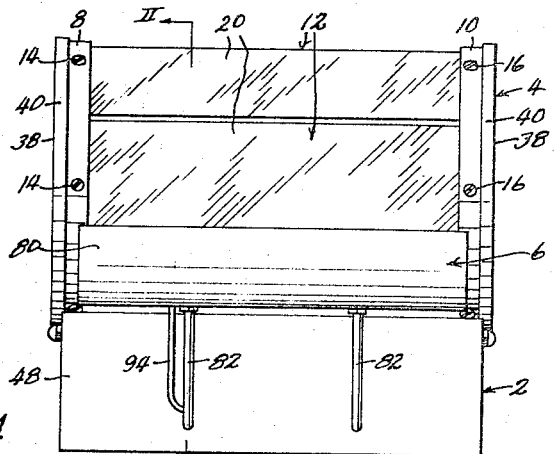
Figure 2:
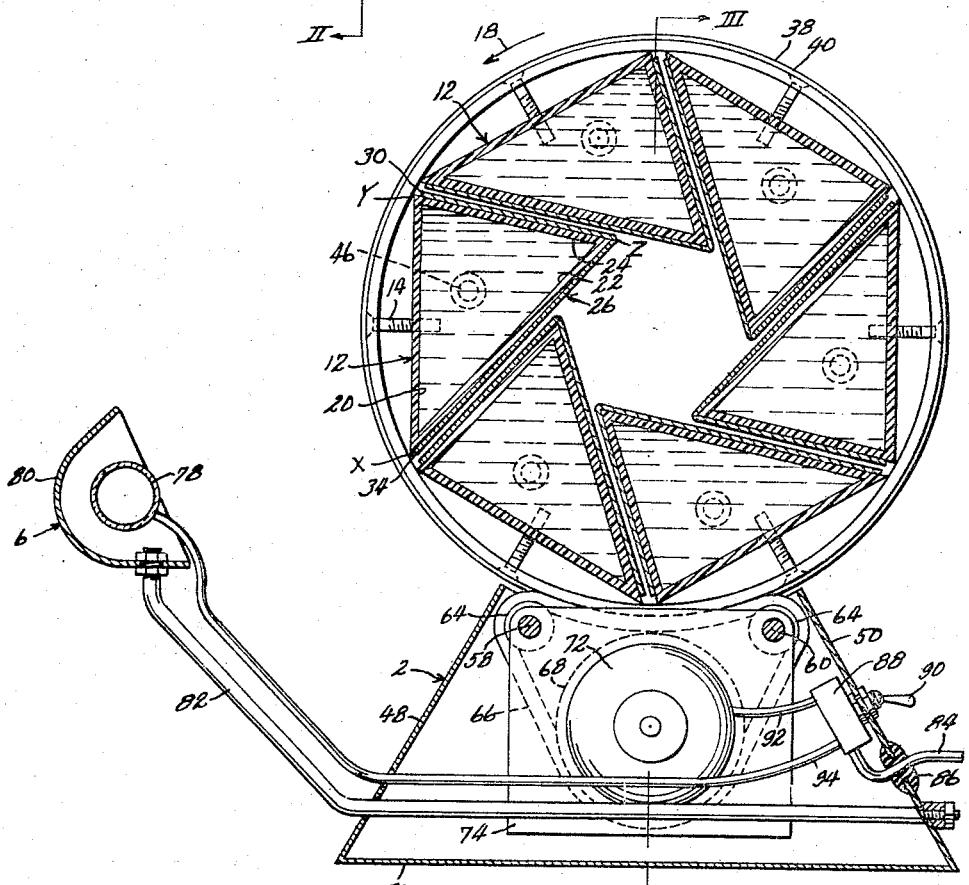
Figure 3:
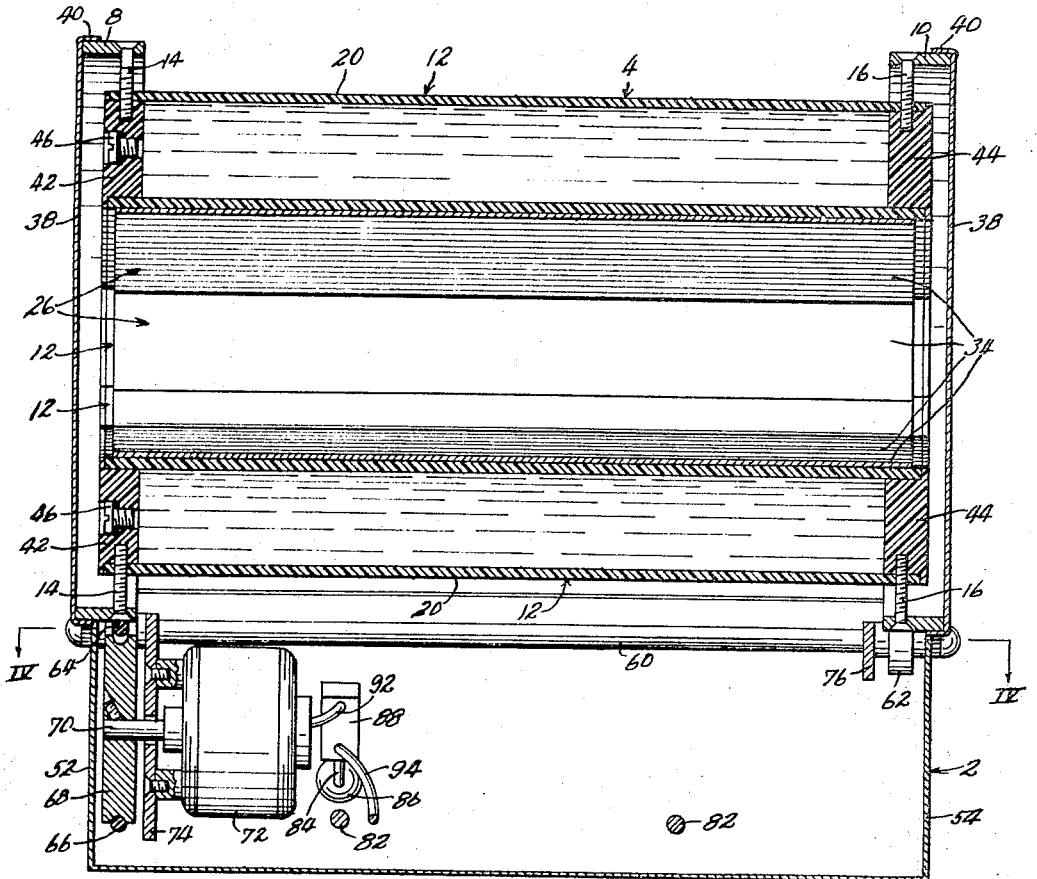
Figure 4:
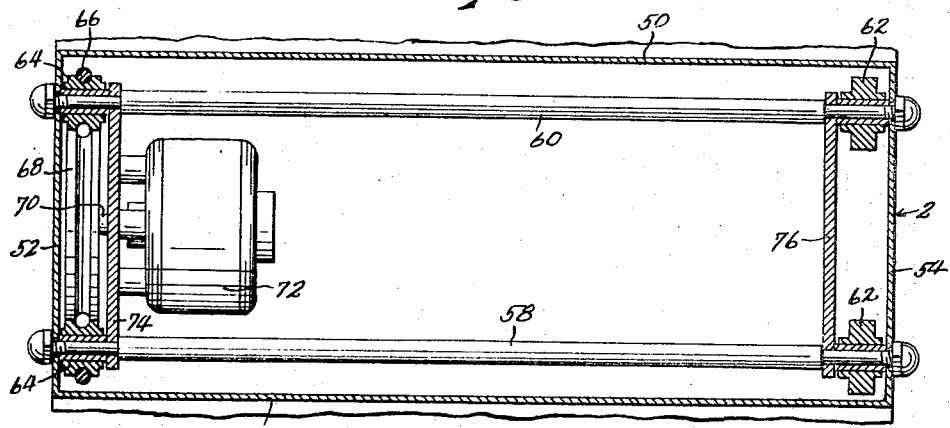
Figure 5:
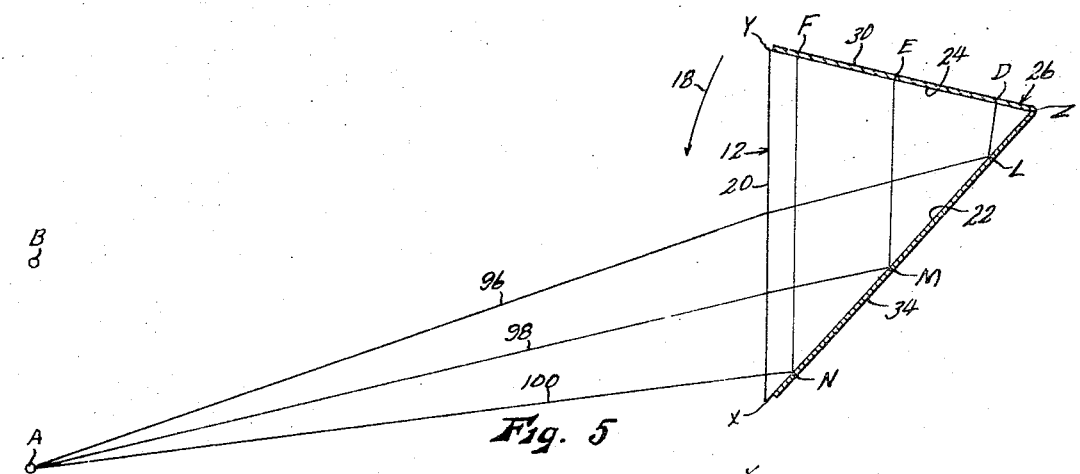
Figure 6:
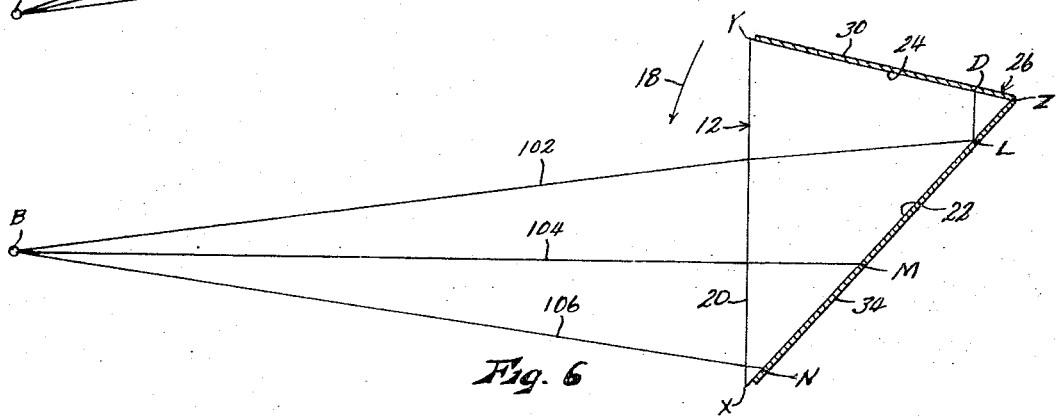
Figure 7:
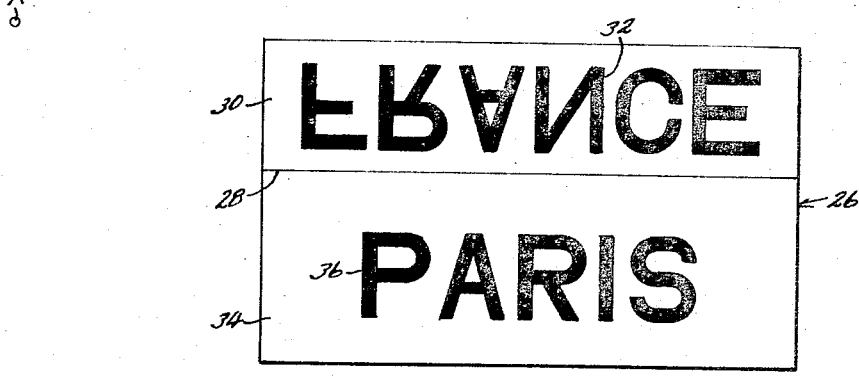

With these objects in view, as well as other objects which will appear in the course of the specification, reference will be had to the accompanying drawing, wherein:

FIG. 1 is a front elevational view of a display sign embodying the present invention, FIG. 2 is an enlarged sectional view taken on line II—II of FIG. 1, FIG. 3 is a sectional view taken on line III—III of FIG. 2, with parts left in elevation, FIG. 4 is a fragmentary sectional view taken on line IV—IV of FIG. 3, FIG. 5 is an optical diagram showing the position of the viewer's eye with respect to the sign prism at the moment the first image begins to disappear and the second image begins to appear, FIG. 6 is an optical diagram showing the position of the viewer's eye with respect to the prism at the moment the first image completely disappears and the second image has completely appeared, and FIG. 7 is a laid-out face view of one of the sign panels.

Like reference numerals apply to similar parts throughout the several views, the display sign forming the subject matter of the present invention consisting generally of a base 2, a drum 4 carried rotatably by said base, and a light fixture 6 carried by the base and adapted to illuminate the drum. Drum 4 is essentially cylindrical with its axis disposed horizontally, and includes a pair of cylindrical hoops 8 and 10 disposed respectively at opposite ends thereof. Extending between and connecting said hoops are a plurality (six as shown) of prisms 12, each of said prisms having its longitudinal axis parallel to the drum axis and being of uniform triangular cross-sectional contour about its axis. The prisms are equally spaced angularly about the axis of the drum, one end of each prism being secured by a screw 14 to hoop 8, and the other end thereof being secured to hoop 10 by a screw 16, whereby the prisms and hoops are held rigidly in assembly. By means which will presently be described, drum 4 is rotated about its axis in the direction of arrow 18 in FIG. 2. The outer face 20 of each prism is disposed at right angles to a radial plane of the drum containing the horizontal midline of said face. For reasons to be described, the leading angle X of each prism, in its direction of rotation, is 42 degrees, so that face 22 of the prism is at 42 degrees to face 20, and the trailing angle Y of each prism is 78 degrees, so that face 24 is at 78 degrees to face 20. Thus the internal angle Z of each prism, and the angle of face 22 to face 24, is 60 degrees. Therefore the prisms nest together to form a generally hexagonal drum as best shown in FIG. 2, the confronting faces 22 and 24 of adjacent prisms being slightly spaced apart as shown. Each prism also utilizes a rectangular sign placard 26 best shown in FIG. 7. Said placard is formed of paper, cardboard or other foldable material, and is divided by a fold line 28 into a first panel 30 which overlies and substantially covers face 24 of the prism, and on which is imprinted display matter 32 in inverted form, and a second panel 34 which overlies and substantially covers face 22 of the prism, and on which is imprinted display matter 36 in normal upright position. The fold line 28 of the placard engages internal angle Z of the prism. The placards may be adhered to the prisms if desired, but will be retained in position by their own stiffness, and are preferably left loose in order that they may be removed and inserted through the ends of the drum whenever it is desired to change the matter being displayed. The ends of the drum are closed by a pair of circular covers 38 each having a peripheral lip 40 frictionally engaging the hoops 8 and 10 respectively, either of said covers being readily removable to provide easy access to the placards.

In the interests of economy, the prisms 12 are not formed of solid light-refracting material such as glass, but constitute hollow boxes filled with water. The box walls defining faces 20, 22 and 24 of the prism are planar and formed of a transparently clear plastic. Each prism box is also provided with end walls 42 and 44 (see FIG. 3) which may or may not be transparent, and into which mounting screws 14 and 16 are respectively threaded. End wall 42 of each prism is provided with a filling opening normally sealed by a threaded plug 46, for introducing water into the box. Thus when considering the optical properties of the prisms, they may be considered to be water prisms having the refractive index of water, since while the plastic walls of the boxes of course have refractive properties, and a refractive index different from that of water, any incident light ray entering either surface of a box wall will be refracted equally but oppositely at the two surfaces thereof and will thus emerge in a direction parallel to the incident ray.

Base 2 of the sign comprises a rectangular sheet metal box having a front wall 48 and a rear wall 50 which are upwardly convergent, vertical end walls 52 and 54, and a floor 56. Said box is open at its top. Extending between and rigidly fastened in end walls 52 and 54, in the upper portion of the box, are a pair of parallel, spaced apart rods 58 and 60. Adjacent end wall 54, a roller 62 is mounted rotatably on each of said rods, said rollers supporting one end of drum 4 by engagement thereof with hoop 10 of said drum. Adjacent end wall 52 of the base, a pulley wheel 64 is mounted on each of rods 58 and 60. A belt 66 is trained about said pulley wheels, and about a third pulley wheel 68 disposed beneath and between pulley wheels 64. Pulley wheel 68 is fixed on the output shaft 70 of a motor-gear unit 72 which is mounted on a plate 74 disposed at right angles to rods 58 and 60, being affixed to said rods and depending therefrom. Hoop 8 of drum 4 rests on belt 66 between pulley wheels 64, said belt being sufficiently slack to permit cradling of hoop 8 between said pulley wheels. Thus when motor-gear unit 72 is energized, it drives belt 66 through pulley wheel 68 and causes drum 4 to rotate about its geometric axis, in the direction of arrow 18 in FIG. 2. Preferably the gear reduction built into the motor unit is such that drum 4 turns one revolution in about 30–60 seconds, although this is of course a matter of choice.

A second plate 76, parallel to plate 74, extends between and is affixed to rods 58 and 60 adjacent rollers 62, as shown in FIGS. 3 and 4. The extreme upper edge portions of plates 74 and 76 extend upwardly between the confronting faces of drum loops 8 and 10, respectively directly adjacent said hoops, as best shown in FIG. 3. Thus said plates serve as stops preventing any appreciable movement of the drum parallel to its axis, and retain hoops 8 and 10 in engagement with belt 66 and rollers 62.

The front side of drum 4, being that portion thereof above front base wall 48 is illuminated by a horizontal tubular lamp 78 mounted in a reflector 80 spaced forwardly from the drum and supported by a pair of arms 82 fixed in base 2. For reasons to be described, lamp 78 is preferably a "black light," emanating rays rich in ultra-violet light, and the placards 26 are printed in fluorescent dyes and inks which will fluoresce or glow when struck by fluorescent light. An electric supply cable 84 enters base 2 through a grommet 86 in rear wall 50 and enters a manually operated toggle switch 88 mounted on said wall and controlled by lever 90. A cable 92 extends from switch 88 to motor-gear unit 72, and a cable 94 extends from switch 88 to lamp 78. It will be understood that the motor-gear unit and the lamp are energized whenever switch 88 is closed.

An understanding of the optical features of the operation of the sign may be gained by a study of the diagrams shown in FIGS. 5 and 6. First, although well known, it is important to note that all light-transmitting materials have a light refraction index, defined as the ratio between the sine of the angle of incidence of a light ray striking a surface thereof to the sine of the angle of said ray when it has been refracted (deflected) by passage through said surface into the interior of said material, both angles being measured from a line normal to the surface. Also, when the angle of incidence is increased, and the incident ray becomes more nearly parallel to the surface, an angle is reached at and beyond which the ray does not enter the material at all, but is instead totally reflected from said surface as it would from a mirror. This transition occurs whether the ray approaches the surface from the air or from the interior of the material itself. This angle, measured from the normal, is called the critical angle, and is a function of the refractive index. The refractive index for water is about 1.33, and the critical angle is about 48 degrees. The diagrams of FIGS. 5 and 6 have been constructed accordingly. In said diagrams, points D, E and F represent points respectively at the top, middle and bottom of the image of placard panel 30, and points L, M and N represent points respectively at the top, middle and bottom of the image of sign panel 34. Points A and B represent two points from which the eye of an observer views the prism at successively different times as the prism is rotated in the direction of arrow 18.

From point A, and from points below point A (as viewed in the diagrams), the viewer sees sign panel 30, but not panel 34. Panel 30 is seen because light from any portion thereof can strike the interior face 22 of the prism at an angle from the normal greater than the critical angle, and therefore be reflected therefrom and then refracted by prism face 20, which may be termed the viewing face, to the point A or to points therebelow, as represented by the rays 96, 98 and 100. The image of sign panel 30 is of course inverted by the reflection, but since this panel is imprinted in an inverted form as shown in FIG. 7, it appears upright to the viewer. On the other hand, light from panel 34, to reach point A or any point therebelow, would have to enter face 22 of the prism at an angle from the normal greater than the critical angle. This it of course cannot do, being instead externally reflected from face 22, so panel 34 is not seen.

When the prism has turned until the observer's eye has reached point A relative thereto, light from the bottom F of panel 30, as represented by ray 100, must strike prism face 22 exactly at the critical angle (by construction). Any further rotation of the prism will necessitate still further reduction of the angle of incidence of ray 100 on face 22, whereupon said ray will pass through face 22 rather than being internally reflected. Therefore the observer cannot see point F of panel 30 from any point above point A. When the observer's eye reaches point B, as in FIG. 6, light from the top point D of panel 30 strikes face 22 at the critical angle. Thus from point B or any point thereabove, panel 30 cannot be seen by the observer at all. At points intermediate A and B, gradually decreasing portions of the upper part of panel 30 may be seen.

When the observer's eye is at point A, light from the lowermost point N of panel 30 can enter face 22 at less than the critical angle, and be refracted to point A, and higher points. When the observer's eye reaches point B, light from the topmost point L of panel 34 can enter face 22 at less than the critical angle, and be refracted to point B and points above. The lines of sight from the top, middle and bottom of panel 34 are then represented by rays 102, 104 and 106. Thus at point B and above, the observer's eye can see all of panel 34, but, as previously described, not panel 30.

The transition of images occurring between points A and B takes the form of a vertical "wipe" from bottom to top, each portion of panel 34 appearing at the same instant the corresponding portion of panel 30 disappears. This is quite satisfactory, but in actual practice another interesting effect often occurs. Since the points A and B are spaced apart by substantially the same distance regardless of the distance of the observer's eye from the prism, and since the prism is ordinarily viewed from much greater distances than indicated in the diagram, the transition often occurs in an extremely small angle of rotation of the drum, so as to appear almost instantaneous. Also, due to small irregularities of the prism faces, the transition may appear to be irregular, splotchy or "patternless," which is highly intriguing.

The specific angles of the prisms, while not particularly critical from optical considerations, have nevertheless been ascertained as a result of various operational advantages derived thereby. Angle X thereof, being the angle between faces 20 and 22 should be as close as practically convenient to the critical angle of the prism material (48 degrees for water), in order that the image transition between points A and B will occur when the observer's line of view is as close as possible to right angles to viewing face 20, the images of both of panels 30 and 34 being of maximum size and clarity at that time. However, by decreasing this angle slightly, the proportion of the vertical height of viewing face 20 apparently occupied by the visible image from face 22 may be increased and the proportion occupied by the visible image from face 24 is reduced. This is important since the image from face 24 always appears inverted, and could be distracting to the viewer if it occupied any great portion of the field of view. However, if this face 24 image is reduced in proportion to the total view field as in the present device, and is rendered further indecipherable by its inverted position, it is not considered objectionable. Angle Z, between faces 22 and 24, should never be less than the complement of angle X, since then face 24 would directly obstruct the viewer's line of sight to the upper portion of panel 34. Thus, if angle X were 48 degrees, angle Z should be no less than 42 degrees, leaving at most 90 degrees for angle Y. However, increasing angle Z still further so that angle Y is less than 90 degrees, increases the angle of rotation of the drum during which face 22 may effectively be viewed, and this of course is desirable. On the other hand, angle Z should in no event be greater than twice the critical angle of the prism material (or 96 degrees for a water prism), since then the reflected image of panel 30 would disappear, by inability to enter face 24 at greater than the critical angle, before the direct image of panel 34 could appear. Finally, it is desirable that the angles of the prism should be such that an integral number of prisms can be nested in a drum so that the veiwing faces thereof form substantially the entire peripheral surface of the drum, and so that the adjacent faces of successive prisms are parallel to assist in retaining the sign placards 26 in place. This of course means that the sum of the interior angles Z of all of the prisms should be 360 degress. Taking into account all of these considerations, the structure shown has evolved, wherein angles X, Y and Z are 42 degrees, 78 degrees and 60 degrees respectively, although variation therefrom is of course possible within the scope of the invention.

The direction of rotation of the drum could of course be reversed, and the effect would be the same except that sign panels 30 and 34 would then be viewed in reverse order, and the subject matter of the panels would require adjustment correspondingly. The same reversal of order could be obtained simply by reversing the drum end-for-end on base 4, even without reversing the drive of the drum. In either case, sign panel 30 would still necessarily be imprinted in inverted position. In this connection it may be stated that the sign panel overlying the face of the prism opposite the angle thereof most nearly corresponding to the critical angle of the prism material should always be imprinted in inverted position for most effective viewing.

With regard to the use of ultraviolet "light" and fluorescent dyes and inks on the sign panels, it has been found to possess a particular advantage in the structure shown in addition to the weirdly beautiful lighting effects obtainable thereby, which are of course well known. It is well known that the reflection of visible light from panels such as used here is directional, depending on the angle of incidence. In the present structure, therefore, if the only light emanating from the panels were visible light reflected therefrom, such light might at some times reach the panels at a poor angle to reach the viewer's eye, so that portions of the panels would appear to be dark or only poorly illuminated. With the ultraviolet light and fluorescent pigments, however, the pigments themselves emit visible light in response to the invisible ultraviolet, directing visible light in all directions from every point of the panel. Thus the apparent illumination and visibility of all portion of the placard is rendered more uniform, and dark areas are eliminated. This feature of course requires prisms which are formed of material which is capable of transmitting ultraviolet freely. Ordinary glass is only slightly transparent to ultraviolet light, but both water and many types of plastic of which the prism boxes may be formed, such as Lucite, transmit ultraviolet light freely.

Besides the optical illumination features already discussed at length, the present structure possesses several novel features of mechanical structure and arrangement. These features include the power drive whereby a series of prisms, with a corresponding series of messages, are brought successively into view of an observer who may himself remain stationary, the structure of drum 4 whereby the sign placards 26 may be freely changed at any time without interference from members supporting the drum, and without requiring fastening of any kind, and the cradle or "centerless" support of the drum whereby said drum may be easily and conveniently removed from the base for servicing.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A display sign comprising:
    (a) a triangular prism,
    (b) means for rotating said prism about an axis parallel to its geometric axis, and
    (c) a pair of sign panels having indicia imprinted thereon overlying and facing two of the three faces of said prism, the third face of said prism being unobstructed and constituting a viewing face through which said sign panels may be observed.

2. A display sign as recited in claim 1 wherein one of the angles of said prism between said viewing face and one of the other faces thereof approximates the critical angle of light refraction of the material of which said prism is formed.

3. A display sign as recited in claim 1 wherein one of the angles of said prism between said viewing face and one of the other faces thereof approximates the critical angle of light refraction of the material of which said prism is formed, and wherein the angle between the two panel-covered faces is less than twice said critical angle, but greater than the complement of said critical angle.

4. A display sign as recited in claim 3 wherein the indicia of the sign panel covering the face of said prism opposite the angle thereof approximating said critical angle is imprinted in inverted position, considering the angle between the panel-covered faces of the prism as a base, whereby said indicia will appear upright to an observer when seen through said viewing face by internal reflection from the other panel-covered face.

5. A display sign as recited in claim 1 wherein said prism is formed of a material having a critical angle of light refraction of about 48 degrees from normal, and wherein the angles of said prism bounding said viewing faces are 42 degrees and 78 degrees respectively, the angle between said panel-covered surfaces being 60 degrees.

6. A display sign as recited in claim 1 wherein said sign panels are imprinted with a fluorescent material and said prism is formed of material transparent to ultraviolet radiant energy, and with the addition of:
    (a) a source of ultraviolet radiant energy positioned to direct said energy toward said prism.

7. A display sign as recited in claim 1 wherein said prism constitutes a hollow, planar-walled box formed of transparently clear material, said box being completely filled with water.

8. A display sign as recited in claim 1 including a plurality of said prisms arranged in angularly spaced relation about an axis, with their geometric axes parellel, to form a drum, the viewing faces of said prisms constituting the peripheral surface of said drum, and wherein said rotating means is operable to rotate said drum about its geometric axis.

9. A display sign as recited in claim 8 wherein adjacent faces of successive prisms are parallel and closely spaced apart, whereby to receive said sign panels slidably therebetween, and wherein the two sign panels of such prism constitute a single placard of resilient material folded along a line coinciding with the angle of the prism between the panel-covered faces thereof to form the two panels, whereby said placards are retained in position without being secured to said prisms in any way.

10. A display sign as recited in claim 9 wherein the spaces between successive prisms are open at the ends of said drum, whereby said sign placards may be slidably inserted and removed from the ends of the drum, in a direction parallel to the axis thereof.

11. A display sign as recited in claim 8 including six of said prisms, whereby said drum is rendered essentially hexagonal, and wherein the angles of each prism bounding the viewing face thereof are respectively 42 degrees and 78 degrees, the third angle of each prism, extending toward the drum axis, being 60 degrees.

12. A display sign as recited in claim 8 wherein said drum includes a pair of cylindrical hoops respectively encircling the extreme opposite end portions of said prisms, said prisms being affixed to said hoops, and wherein said rotating means comprises:
 (a) a base,
 (b) a first pair of horizontally spaced apart, coplanar rollers carried by said base for rotation on horizontal axes, one of said hoops being cradled between and supported by said rollers,
 (c) a second pair of rollers carried rotatably by said base respectively coaxial with said first pair of rollers but positioned to be engaged by and to support the other of said hoops, and
 (d) power means carried by said base and operable to rotate one of said pairs of rollers, whereby said drum is rotated about its own geometric axis.

13. A display sign as recited in claim 12 wherein said power means includes:
 (a) an electric motor mounted in said base,
 (b) a pulley rotatably driven by said motor, and
 (c) a flexible belt trained about said pulley and about both rollers of one of said pairs of rollers, the hoop associated with said last-named pair of rollers resting on said belt at and between said rollers.

14. A display sign as recited in claim 8 wherein said sign panels are imprinted in fluorescent material, wherein said prisms are formed of material transparent to ultraviolet radiant energy, and with the addition of:
 (a) an electrically powered source of ultraviolet radiant energy carried by said base and positioned to direct said energy toward the external surface of said drum.

References Cited
UNITED STATES PATENTS

| | | | |
|---|---|---|---|
| 1,739,592 | 12/1929 | Hyatt | 40—77 |
| 2,689,917 | 9/1954 | Switzer | 250—71 |
| 2,879,614 | 3/1959 | Baldanza | 40—134 |

ARCHIE R. BORCHELT, *Primary Examiner.*